Feb. 2, 1932. C. H. POWELL 1,843,733

OIL PUMP

Filed July 13, 1929

INVENTOR:
Clarence H. Powell,
by Macleod Calm Copeland & Dike
Attys.

Patented Feb. 2, 1932

1,843,733

UNITED STATES PATENT OFFICE

CLARENCE HENRY POWELL, OF DETROIT, MICHIGAN, ASSIGNOR TO HUDSON MOTOR CAR COMPANY, OF DETROIT, MICHIGAN, A CORPORATION OF MICHIGAN

OIL PUMP

Application filed July 13, 1929. Serial No. 378,136.

My present invention relates to pumps and particularly to oil pumps for internal combustion engines such as are used in automobiles and airplanes, although it is capable of use in many other places. The oil pump embodying my invention has only two moving parts, namely the piston and crank and has no valves of any kind. The device, therefore, has a reliability and certainty of action which is exceedingly important since any failure of the lubricating or fuel system of an automobile or airplane is very serious. The pump embodying my invention is so constructed that it is practically impossible for it to get out of order. It cannot clog or fail to operate under any but the most extraordinary conditions and its efficiency is not appreciably affected by long continued use. In fact since the liquid which is pumped acts as a lubricant the pump has an almost unlimited life. The device is also so constructed that it can be manufactured with sufficient accuracy, cheaply and rapidly.

In said drawings:

Figs. 7, 8 and 9 are diagrams showing the relation of the piston grooves to the suction and outlet ports of the pump, Fig. 7 showing the piston in either of its extreme positions, while Figs. 8 and 9 show it in mid-position going up and down respectively.

Figure 1:
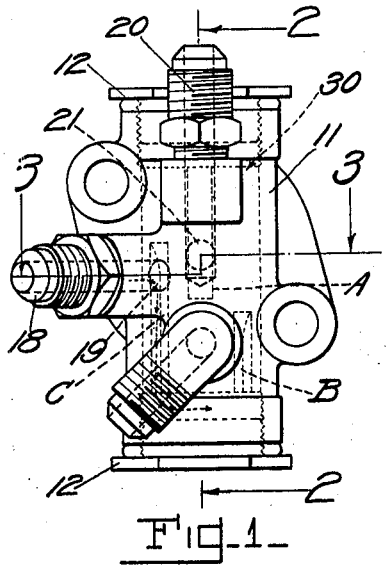
Fig. 1 is a view in elevation of a pump embodying the invention, the piston being shown in mid-position on the upward stroke.

In the drawings forming part of this specification my invention is shown as embodied in a double acting pump intended for use in supplying lubricating oil simultaneously to two points in the lubricating system as, for instance, both ends of a circulating splash lubricating system for automobile engines. It will be understood, however, that the pump is also capable of use where it is desired to supply lubricant to one point only.

In the drawings the pump casing, designated 11, is formed with a straight cylindrical chamber or pump cylinder 10 which is produced by drilling through the pump body from end to end and then closing the ends by caps 12—12 and gaskets 13. Extending laterally from one side of the pump casing is a boss 14 which is drilled lengthwise to provide a bearing for the operating shaft 15. This operating shaft is provided at its outer end with a spiral gear 16 or other convenient means for causing the shaft 15 to be rotated. On the inner end of the shaft and integral with it is formed an eccentric ball 17 which is in effect a crank. The casing is also provided with other bosses through which are drilled ports and which also form points of connection for the pipes connected to the pump. The suction is through the pipe 18 and port 19, the front outlet is through the pipe 20 and port 21, while the rear outlet is through the pipe 22 and port 23. The front outlet is supplied from the upper end of the pump and the rear outlet is supplied from the lower end of the pump as will be explained hereafter.

Figure 5:
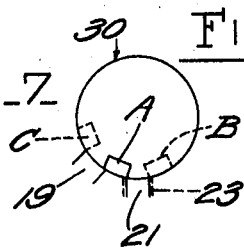
Fig. 5 is a section taken on line 5—5 of Fig. 4.
Figure 4:
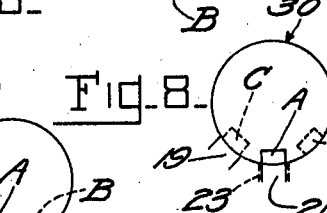
Fig. 4 is a detail view of the plunger.

Within the pump cylinder 10 is the piston 30. This piston is shown in detail and separate from the other parts in Figs. 4 and 5. It consists merely of a cylindrical piece of suitable metal provided with three ports A, B, C, which are conveniently grouped on one side of the cylinder 30, and a hole or recess D which is on the other side of the cylinder. The ports A, B and C serve to connect the several ports 19, 21 and 23 successively with the end spaces in the pump cylinder and the hole or recess D forms a point of engagement for the crank ball 17.

Figure 2:
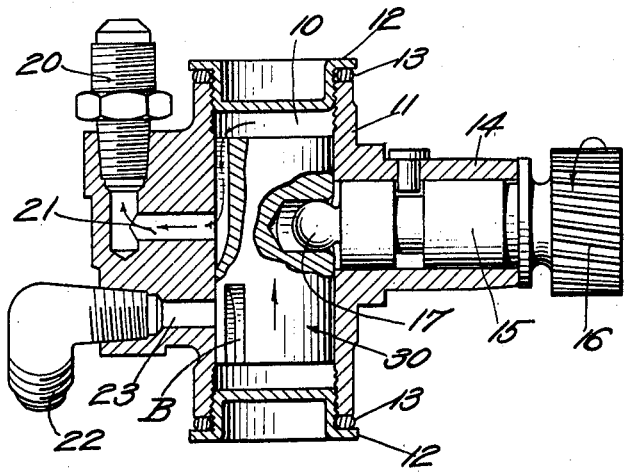
Fig. 2 is a section taken on line 2—2 of Fig. 1.
Figure 3:
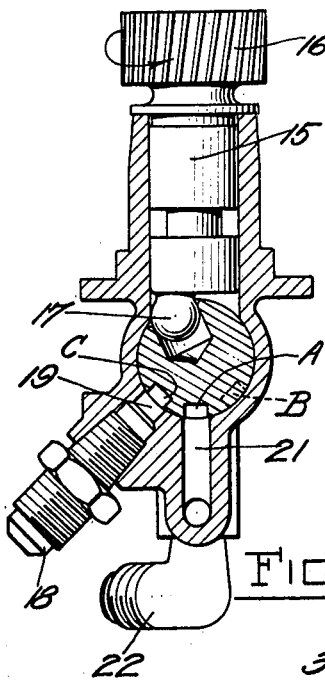
Fig. 3 is a section taken on line 3—3 of Fig. 1.
Figure 6:
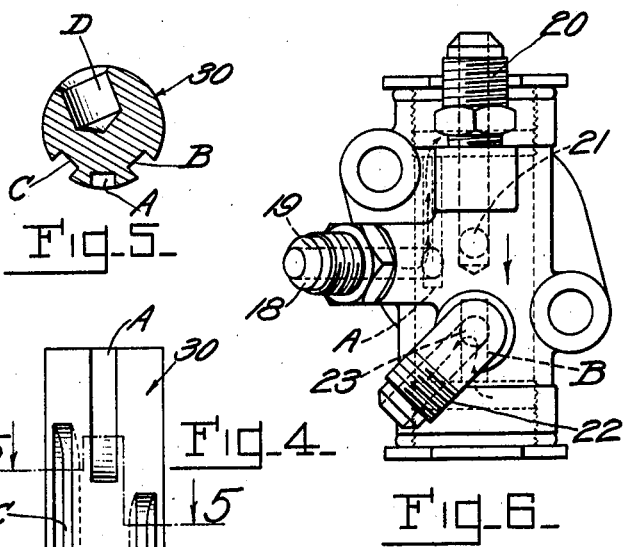
Fig. 6 is a view similar to Fig. 1 showing the piston in mid-position but on the downward stroke.
Figures 7, 8, 9:
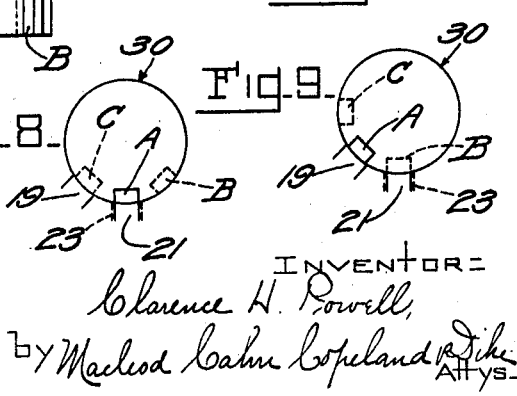

In the operation of the device the rotation of the shaft 15 oscillates the piston 30 from the position shown in diagram in Fig. 8, which corresponds to the positions shown in Figs. 1 to 3 inclusive, to the position shown in diagram in Fig. 9, which corresponds to the position shown in Fig. 6, and at the same time reciprocates the piston lengthwise of the pump cylinder, the vertical stroke of the pump being the outside diameter of the shaft 15 which carries the crank ball 17.

The operation of the pump will be readily understood by considering four successive phases of the parts.

Considering first the lower end of the pump cylinder, on the up stroke, which is the suction stroke for that end, the suction port 19 is connected by the port C in the piston (see Figs. 7 and 8) with the chamber below the piston. At the same time the rear outlet port 23 is closed, due to the fact that the delivery groove B is out of register therewith. As the piston rises and oscillates the oil flows in through the suction port 19 to fill the lower end of the chamber, then the suction port is closed and the rear outlet port 23 is connected by the delivery groove B (see Fig. 9) so that on the down stroke of the piston the fluid in the lower end of the pump cylinder is forced out through the rear outlet.

Considering now the upper end of the pump cylinder, on the down stroke of the piston, which is the suction stroke for that end, the suction port 19 is connected by the port A in the piston (see Fig. 9) with the chamber above the piston. At the same time the front outlet port 21 is closed. As the piston descends and oscillates the fluid flows in through the suction port 19 to fill the upper end of the chamber, then the suction port is closed and the front outlet port 21 is connected in its turn by the port A so that on the up stroke of the piston the fluid in the upper end of the pump cylinder is forced out through the front outlet 21.

It will therefore be seen that on the up stroke of the piston the lower end of the pump is sucking oil through port 19 and the port C in the piston, while at the same time the upper end of the pump is discharging oil through the port A in the piston and the front outlet 21. On the down stroke the lower end of the pump discharges oil through the port B in the piston and the rear outlet 23 while the upper end is sucking oil through the suction port 19 and the port A in the piston.

What I claim is:

1. An improved pump comprising a casing having a suction port and two outlet ports, a piston in said casing provided with a recess in its cylindrical surface and three longitudinal grooves capable of register with the ports in the casing wall, a shaft at right angles to the axis of movement of the piston and means on the shaft and engaging the piston to reciprocate and oscillate said piston.

2. A double-acting valveless pump comprising a cylinder having a suction or inlet port and two outlet ports on opposite sides, lengthwise of said cylinder, of said suction or inlet port, a piston having longitudinal grooves and a recess, and means for reciprocating and oscillating said piston to cause the grooves of said piston to register, at proper times, with the ports in said cylinder, said means consisting of a rotating shaft having a crank ball working on the recess with which said piston is provided.

3. An improved pump comprising a cylinder having a suction port and two outlet ports connected with the respective ends of said cylinder and a piston having three grooves formed in the sides thereof, one of said grooves communicating with one end of the cylinder and the other two grooves communicating with the other end of the cylinder.

4. An improved pump comprising a cylinder having a suction port and two outlet ports connected with the respective ends of said cylinder, a piston having three grooves formed in the sides thereof, one of said grooves communicating with one end of the cylinder and the other two grooves communicating with the other end of the cylinder, and means for reciprocating and oscillating said piston to cause the grooves of said piston to register, at proper times, with the ports in said cylinder.

5. An improved pump comprising a cylinder having a suction port and two outlet ports, a piston having a plurality of longitudinal grooves formed exteriorly in the sides thereof, said piston being otherwise solid and unbroken, and means for reciprocating and oscillating said piston to cause said grooves to register, at proper times, with said ports.

In testimony whereof I affix my signature.

CLARENCE HENRY POWELL.